United States Patent
Demetriou et al.

(10) Patent No.: US 8,066,827 B2
(45) Date of Patent: Nov. 29, 2011

(54) NI AND CU FREE PD-BASED METALLIC GLASSES

(75) Inventors: Marios D. Demetriou, Los Angeles, CA (US); Aaron Wiest, Los Angeles, CA (US); William L. Johnson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 281 days.

(21) Appl. No.: 12/172,908

(22) Filed: Jul. 14, 2008

(65) Prior Publication Data
US 2009/0162629 A1    Jun. 25, 2009

Related U.S. Application Data

(60) Provisional application No. 60/959,296, filed on Jul. 12, 2007.

(51) Int. Cl.
C22C 45/00        (2006.01)
C22C 5/04         (2006.01)
(52) U.S. Cl. .......................... 148/403; 148/430; 420/463
(58) Field of Classification Search .................. None
See application file for complete search history.

(56) References Cited

U.S. PATENT DOCUMENTS 4,995,923 A * 2/1991 Mizumoto et al. ............ 148/304
7,582,172 B2 * 9/2009 Schroers et al. ............... 148/403

OTHER PUBLICATIONS

ASM Handbook, vol. 2, "Preparation and Characterization of Pure Metals", G.T. Murray et al., pp. 1093-1097, ASM International, 1990.*
Chen, H.S., "The Glass Transition Temperature in Glassy Alloys: Effects of Atomic Sizes and The Heats of Mixing," ACTA METALLURGICA, vol. 22, Jul. 1974, pp. 897-900.
Chen, H.S., et al., "Formation, Stability and Structure of Palladium-Silicon Based Alloy Glasses," ACTA METALLURGICA, vol. 17, Aug. 1969, pp. 1021-1031.
Liu, Li, et al., "Formation of Bulk Pd-Cu-Si-P Glass with Good Mechanical Properties," Materials Transactions, vol. 46, No. 2 (2005), pp. 376 to 378.
M. Dutoit and H.S. Chen, "Frequency and temperature dependence of ulrasonic attenuation in glassy Pd-Si-based metal alloys," Appl. Phys. Lett., vol. 23, No. 7, Oct. 1, 1973, pp. 357-358.

* cited by examiner

Primary Examiner — George Wyszomierski
(74) Attorney, Agent, or Firm — Christie, Parker & Hale, LLP (57) ABSTRACT

The invention is directed to Pd-based metallic glass alloys useful in biomedical applications having no Ni or Cu. Exemplary metallic glass alloys are represented by $A_a B_b \{(Si)_{100-c}(D)_c\}_d$, where A may be selected from Pd, and combinations of Pd and Pt, B may be selected from Ag, Au, Co, Fe, and combinations thereof, and D may be selected from P, Ge, B, S. Also, a, b, c and d are atomic percentages, and a ranges from about 60 to about 90, b ranges from about 2 to about 18, d ranges from about 5 to about 25, and c is greater than 0 and less than 100.

19 Claims, 7 Drawing Sheets

NI AND CU FREE PD-BASED METALLIC GLASSES

CROSS-REFERENCE TO RELATED APPLICATION(S)

This application claims priority to and the benefit of Provisional Application Ser. No. 60/959,296, filed on Jul. 12, 2007 and entitled NI AND CU FREE PD-BASED GLASSES, the entire content of which is incorporated herein by reference.

FIELD OF THE INVENTION

The invention is directed to Ni and Cu free Pd-based metallic glasses. More particularly, the invention is directed to Pd-based glass-forming alloys useful in biomedical applications.

BACKGROUND OF THE INVENTION

Metallic glasses, unlike conventional crystalline alloys, have amorphous or disordered atomic-scale structures that give rise to unique chemical, mechanical, and rheological properties. Owing to their atomic structure, metallic glasses generally exhibit better corrosion resistance than typical crystalline alloys, higher hardness, strength, and elasticity, and are able to soften and flow when relaxed above their glass transition temperatures ($T_g$), a characteristic that allows for considerable processing capability. Previously, metallic glasses were only capable of being produced in sub-millimeter dimensions (thin ribbons, sheets, wires, or powders) due to the need for rapid cooling from the liquid state to avoid crystallization. However, recent developments in bulk glass-forming alloys have enabled the production of metallic systems with very sluggish crystallization kinetics able to form glasses in dimensions as large as several centimeters. These developments have permitted the introduction of metallic glasses in many engineering applications where their unique chemical and mechanical properties, including good corrosion resistance, high strength and hardness, and large elastic elongation, are desirable.

The most robust glass-forming metallic system to date is a Pd—Ni—Cu—P alloy, which is capable of forming amorphous parts with thicknesses as large as seven centimeters. The ability to produce metallic glass ingots of such increased thickness has aroused interest in many applications. However, due to the prohibitively high cost of Pd (a noble metal) most of these applications remain out of reach. Applications for which the high cost of noble metals (such as Pd) is not considered as prohibitive include jewelry and biomedical applications (such as orthopedic and dental/orthodontic applications). Interestingly, the noble-metal character of Pd makes Pd-based glasses particularly attractive for such applications. However, the only Pd-based metallic glasses known to achieve dimensions of a few millimeters or more contain either or both Ni and Cu in the alloy composition. Indeed, the glass-forming ability of metals in general is widely known and recognized to be heavily dependent on the inclusion of Ni and/or Cu in the alloy, and it is the inclusion of these metals that enabled the development of such robust metallic glass formers. As such, the inclusion of Ni and Cu is widely accepted as necessary to the formation of glass-forming alloys, and skilled artisans in the field would have no expectation of success in creating a good glass-forming alloy without including at least one of these metals.

While the inclusion of Ni and Cu in metallic glasses is generally suitable and acceptable when the glasses are used for engineering applications, these metals are highly cytotoxic, making metallic glasses including these metals ill suited for biomedical applications. In particular, Ni and Cu are highly electronegative, allowing them to exist as free radicals in the blood stream. Such free radicals are notorious triggers for severe adverse biological reactions in the body. Consequently, Ni and Cu are widely understood and regarded as non-biocompatible, and any metallic glasses including these metals are similarly understood to be non-biocompatible. As the glass-forming ability of amorphous metal alloys is strongly dependent on the inclusion of Ni and/or Cu, development of Pd-based metallic glasses suitable for use in biomedical applications has proved extremely challenging, and no suitable such metallic glass has yet been achieved.

SUMMARY OF THE INVENTION

The invention is directed to metallic glass alloys represented by Formula 1.

$$A_a B_b \{(Si)_{100-c}(D)_c\}_d \tag{1}$$

In Formula 1, A may be Pd, or a combination of Pd and Pt, B may be selected from Ag, Au, Co, Fe, and combinations thereof, and D may be selected from P, Ge, B, S. Also, a, b, c and d are atomic percentages, and a ranges from about 60 to about 90, b ranges from about 2 to about 18, d ranges from about 5 to about 25, and c is greater than 0 and less than 100.

In other embodiments of the invention, three-dimensional objects are formed from the alloys represented by Formula 1. The three-dimensional objects, e.g. rods, have diameters greater than 1 mm and can have diameters as large as 5 mm. In some embodiments, for example, the three-dimensional objects may be rods with diameters ranging from greater than 1 mm to about 4 mm.

BRIEF DESCRIPTION OF THE DRAWINGS

These and other features and advantages of the present invention will be better understood by reference to the following detailed description when considered in conjunction with the attached drawings, in which.

DETAILED DESCRIPTION OF THE INVENTION

To form metallic glasses useful in biomedical applications, the glass-forming alloys should be biocompatible and able to form glassy parts at sufficiently large dimensions (greater than 1 mm) to manufacture the desired biomedical components. Moreover, the glasses should have low Young's modulus and high toughness characteristics. Metallic glasses with these characteristics would be especially useful in biomedical applications such as orthopedic and orthodontic implants and fixation components (wires, nails, plates, screws, etc).

Although Pd-based metallic glasses generally have the required modulus and toughness characteristics and are able to form three-dimensional metallic glass objects of sufficient thickness for biomedical applications, these metallic glasses include at least one of Ni and Cu (and often both), likely making them non-biocompatible and therefore ill suited for use in biomedical applications. However, because Pd-based metallic glasses have desirable modulus and toughness characteristics, the present invention is directed to Pd-based metallic glasses free of Ni and Cu.

In addition to biomedical applications, the inventive alloys that are free of Ni and Cu can be useful in jewelry articles. As Ni and Cu are known to produce allergic reactions in many individuals, the inventive alloys, excluding these metals, are particularly suitable for use in jewelry applications.

In some embodiments of the present invention, a metallic glass includes a biocompatible alloy represented by Formula 1.

$$A_a B_b \{(Si)_{100-c}(D)_c\}_d \quad (1)$$

In Formula 1, A may be Pd, or a combination of Pd and Pt, B may be selected from Ag, Au, Co, Fe, and combinations thereof, and D may be selected from P, Ge, B, S, and combinations thereof. Also, a, b, c and d are atomic percentages, and a ranges from about 60 to about 90, b ranges from about 2 to about 18, d ranges from about 5 to about 25, and c is greater than 0 and less than 100. In one embodiment, B is selected from Au, Ag and combinations thereof. In another embodiment, D is selected from P, Ge, and combinations thereof.

Nonlimiting examples of suitable alloys satisfying Formula 1 include $Pd_{77.5}Ag_6Si_{14}P_{2.5}$, $Pd_{77.5}Ag_6Si_{11.5}P_5$, $Pd_{77.5}Ag_6Si_9P_{7.5}$, $Pd_{77.5}Ag_6Si_{6.5}P_{10}$, $Pd_{77.5}Ag_6Si_4P_{12.5}$, $Pd_{79.5}Ag_4Si_9P_{7.5}$, $Pd_{78.5}Ag_5Si_{11.5}P_5$, $Pd_{76.5}Ag_7Si_{11.5}P_5$, $Pd_{75.5}Ag_8Si_9P_{7.5}$, $Pd_{75.5}Ag_8Si_{11.5}P_5$, $Pd_{75}Ag_{8.5}Si_{11.5}P_5$, $Pd_{73.5}Ag_{10}Si_{11.5}P_5$, $Pd_{76.85}Ag_{8.14}Si_{10.45}P_{4.55}$, $Pd_{74.14}Ag_{7.86}Si_{12.55}P_{5.45}$, $Pd_{75.5}Ag_8Si_9Ge_{2.5}P_5$, $Pd_{75.5}Ag_8Si_{9.5}Ge_2P_5$, $Pd_{75}Ag_{8.5}Si_{9.5}Ge_2P_5$, $Pd_{76}Ag_{7.5}Si_{9.5}Ge_2P_5$, $Pd_{75.5}Ag_8Si_{10.5}Ge_2P_4$, $Pd_{75.5}Ag_8Si_{8.5}Ge_2P_6$, $Pd_{75.5}Ag_8Si_{6.5}Ge_5P_5$, $Pd_{75.5}Ag_8Si_4Ge_{7.5}P_5$, $Pd_{75.5}Ag_8Si_2Ge_9P_5$, $Pd_{73}Ag_8Ge_{14}P_5$, $Pd_{75.5}Ag_8Ge_{11.5}P_5$, $Pd_{77}Ag_8Ge_{10}P_5$, $Pd_{75.5}Ag_8Si_9P_5S_{2.5}$, $Pd_{75.5}Ag_8Si_{2.5}Ge_7P_5S_2$, $Pd_{79}Au_4Si_{12}P_5$, $Pd_{79}Au_4Si_{12}Ge_5$, $Pd_{79}Au_4Si_{9.5}Ge_{2.5}P_5$, and $Pd_{75.5}Ag_8Si_{2.5}Ge_7P_5S_2$.

As denoted in Formula 1 and the exemplary alloys listed above, the Si in the alloy is fractionally substituted with an element selected from P, Ge, B, S and combinations thereof. This fractional substitution of the Si in the alloy improves the glass forming ability by reducing the critical cooling rate needed to bypass crystallization, thereby increasing the achievable size of three-dimensional objects made from the amorphous alloys. Also, the fractional substitution of Si could improve the thermoplastic processability of the amorphous alloy by increasing the temperature range between the glass transition and crystallization, thereby increasing the window of processability in the supercooled liquid region. In addition, the Si substitution in the alloy could also improve the mechanical properties of the alloy by reducing shear modulus and increasing Poisson's ratio, thereby improving fracture toughness and ductility.

In some embodiments, the alloy represented by Formula 1 may include additional alloying elements in atomic percentages that are within the impurity level of about 2%.

One exemplary method for producing an alloy represented by Formula 1 involves inductively melting an appropriate amount of the alloy constituents in a quartz tube under an inert atmosphere. However, for alloys containing high concentrations of P, a P-free pre-alloy is first produced by melting appropriate amount of the alloy constituents (except for P) in a quartz tube under an inert atmosphere, and then adding P by enclosing it with the pre-alloy in a quartz tube sealed under an inert atmosphere. The sealed tube is then placed in a furnace and the temperature is increased intermittently.

According to another embodiment of the present invention, the alloys represented by Formula 1 may be formed into three-dimensional objects useful in many applications. In addition to engineering and mechanical applications, because the metallic glasses of the present invention are free of elements known to cause adverse biological reactions (such as Ni and Cu), three-dimensional objects made from the alloys would be biocompatible and therefore useful in many biomedical applications. For example, the three-dimensional objects may be useful as orthopedic and/or orthodontic implants and fixation components such as wires, nails, plates or screws.

Figure 1:
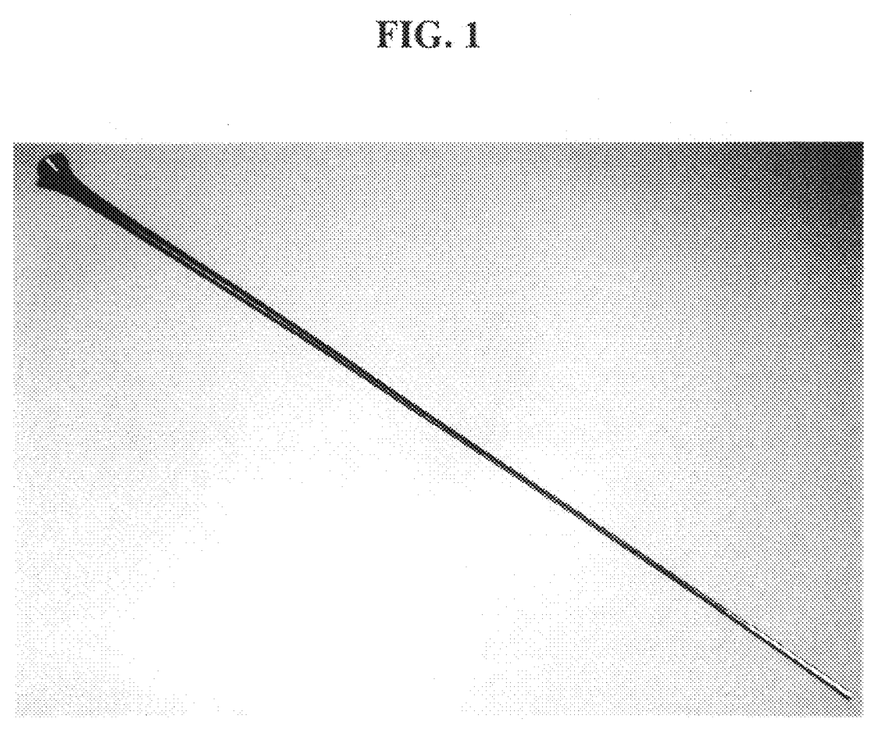
FIG. 1 is a photograph of a 1-mm glassy $Pd_{77.5}Ag_6Si_9P_{7.5}$ wire produced as in Example 3 by the capillary water-quenching method.

The alloys according to the present invention may be used to form three-dimensional bulk objects, e.g. rods, having diameters greater than about 1 mm. FIG. 1 is a photograph of a glassy 1-mm $Pd_{77.5}Ag_6Si_9P_{7.5}$ produced as in Example 3 using the capillary water-quenching method described below. In particular, the alloys can be used to form three-dimensional objects having diameters up to about 5 mm. In many embodiments, for example, the alloys produce three-dimensional objects having diameters ranging from 2 to 4 mm. Because Ni and Cu are generally considered essential in any alloy for achieving three-dimensional objects with such bulk diameters, the ability of the alloys according to embodiments of the present invention, which are free of Ni and Cu, to form objects with these diameters is particularly surprising.

An exemplary method of producing three-dimensional bulk objects having at least 50% (by volume) amorphous phase involves first inductively melting the alloy in contact with a piece of molten de-hydrated $B_2O_3$ in a quartz tube under an inert atmosphere. The entire alloy, while still in contact with the molten de-hydrated $B_2O_3$, is then cooled from above its melting temperature to a temperature below its glass transition temperature at a rate sufficient to prevent the formation of more than 50% crystalline phase.

The following examples are presented for illustrative purposes only and do not limit the scope of the present invention. In the examples, the alloys were prepared by the capillary water-quenching method using elements with purities of about 99.9% or greater. In particular, the elements were weighed to within about 0.1% of the calculated mass, and were ultrasonically cleaned in acetone and ethanol prior to melting. Melting of the elements was performed inductively in quartz tubes sealed under a partial atmosphere of argon. The alloyed ingots were subsequently fluxed with dehydrated $B_2O_3$. Fluxing was performed by inductively melting the ingots together with dehydrated $B_2O_3$ in quartz tubes under argon, holding the melted ingots at a temperature roughly 50 degrees above the alloy melting point for approximately 15 minutes, and finally water quenching the ingots. The fluxed ingots were cast into glassy rods using quartz capillaries. The ingots were placed into quartz tubes attached on the capillaries, melted in a furnace under vacuum, injected into the capillaries using 1.5 atmospheres of argon, and finally water quenched. The amorphous nature of the glassy rods was verified using at least one of the following methods: (a) x-ray diffraction (verification of the amorphous state if the diffraction pattern exhibits no crystalline peaks); (b) differential scanning calorimetry (verification of the amorphous state if the scan reveals a glass transition event followed by a crystallization event upon heating from room temperature); (c) microscopic inspection of rod failure characteristics (verification of the amorphous phase if plastically deformed regions reveal shear band networks, and fracture surfaces exhibit sharply defined shiny facets). The compositions of each of the Examples and Comparative Examples are listed in Tables 1 and 2.

Glass formation is a result of rapidly cooling the material, causing it to bypass the formation of stable crystal configurations and consequently freeze-in a liquid-like atomic configuration (i.e. a glassy state). A relatively good glass former is an alloy that requires relatively low cooling rate to form the glassy state, or alternatively, is capable of forming relatively thick glassy sections for a given cooling rate. The glass forming ability of alloys is therefore quantified in terms of the alloy limiting part dimension that can turn glassy when cooled at a certain heat-removal rate, which is termed the "critical casting thickness." Since the exemplary alloys were quenched in quartz capillaries whose inner diameters and wall thicknesses varied, and since quartz is known to be a poor heat conductor that retards heat transfer, the quartz-capillary wall thickness should also be a factor in determining glass-forming ability of the exemplary alloys. The glass-forming ability of the various exemplary alloys is hence determined by the maximum rod diameter that can be formed glassy based on a given capillary wall thickness. The critical rod diameters and the associated capillary wall thicknesses are tabulated for some exemplary alloys in Table 1, and thermodynamic properties are reported in Table 2. In Table 1, DSC means differential scanning calorimetry, XRD means X-ray diffraction, and INSP means microscopic inspection. In Table 2, $T_g$ is the glass transition temperature, $T_1$ is the crystallization temperature, $\Delta H_x$ is the enthalpy of crystallization, $T_s$ is the solidus temperature, $T_l$ is the liquidus temperature, and $\Delta H_m$ is the enthalpy of melting. In Table 2, the ratio of $T_g$ over $T_s$, which is termed the "reduced glass transition", is given in absolute Kelvin units.

TABLE 1

| Example | Alloy composition | Rod Diameter | Quartz Thickness | Verification Method |
|---|---|---|---|---|
| Comparative Example 1 | $Pd_{77.5}Ag_6Si_{16.5}$ | 1.1 mm | 0.11 mm | DSC |
| 1 | $Pd_{77.5}Ag_6Si_{14}P_{2.5}$ | 1.4 mm | 0.14 mm | DSC, XRD |
| 2 | $Pd_{77.5}Ag_6Si_{11.5}P_5$ | 2.5 mm | 0.25 mm | DSC, XRD |
| 3 | $Pd_{77.5}Ag_6Si_9P_{7.5}$ | 3.0 mm | 0.15 mm | DSC, XRD |
| 4 | $Pd_{77.5}Ag_6Si_{6.5}P_{10}$ | 1.5 mm | 0.15 mm | DSC, XRD |
| 5 | $Pd_{77.5}Ag_6Si_4P_{12.5}$ | 1.0 mm | 0.10 mm | DSC, XRD |
| 6 | $Pd_{78.5}Ag_5Si_{11.5}P_5$ | 2.2 mm | 0.22 mm | INSP |
| 7 | $Pd_{76.5}Ag_7Si_{11.5}P_5$ | 2.4 mm | 0.24 mm | INSP |
| 8 | $Pd_{75.5}Ag_8Si_9P_{7.5}$ | 2.2 mm | 0.22 mm | INSP |
| 9 | $Pd_{75.5}Ag_8Si_{11.5}P_5$ | 2.7 mm | 0.27 mm | DSC, XRD |
| 10 | $Pd_{75}Ag_{8.5}Si_{11.5}P_5$ | 2.7 mm | 0.27 mm | DSC, XRD |
| 11 | $Pd_{73.5}Ag_{10}Si_{11.5}P_5$ | 1.7 mm | 0.17 mm | INSP |
| 12 | $Pd_{76.85}Ag_{8.14}Si_{10.45}P_{4.55}$ | 1.5 mm | 0.15 mm | INSP |
| 13 | $Pd_{74.14}Ag_{7.86}Si_{12.55}P_{5.45}$ | 2.2 mm | 0.22 mm | INSP |
| 14 | $Pd_{75.5}Ag_8Si_9Ge_{2.5}P_5$ | 2.8 mm | 0.28 mm | DSC, XRD |
|  |  | 2.0 mm | 0.5 mm | DSC |
|  |  | 3.0 mm | 0.15 mm | DSC |
| 15 | $Pd_{75.5}Ag_8Si_{9.5}Ge_2P_5$ | 2.5 mm | 0.36 mm | INSP |
| 16 | $Pd_{75}Ag_{8.5}Si_{9.5}Ge_2P_5$ | 2.2 mm | 0.31 mm | INSP |
| 18 | $Pd_{76}Ag_{7.5}Si_{9.5}Ge_2P_5$ | 2.3 mm | 0.33 mm | INSP |
| 19 | $Pd_{75.5}Ag_8Si_{10.5}Ge_2P_4$ | 1.5 mm | 0.21 mm | INSP |
| 20 | $Pd_{75.5}Ag_8Si_{8.5}Ge_2P_6$ | 2.5 mm | 0.36 mm | INSP |
| 21 | $Pd_{75.5}Ag_8Si_{6.5}Ge_5P_5$ | 1.0 mm (P/A) | 0.10 mm (P/A) | DSC, XRD (Partially amorphous) |
| 22 | $Pd_{75.5}Ag_8Si_4Ge_{7.5}P_5$ | 2.4 mm | 0.24 mm | DSC |
| 23 | $Pd_{75.5}Ag_8Si_{2.5}Ge_9P_5$ | 1.5 mm | 0.15 mm | DSC |
| 24 | $Pd_{74}Ag_7Si_5Ge_9P_5$ | 1.5 mm | 0.15 mm | INSP |
| 25 | $Pd_{73}Ag_8Ge_{14}P_5$ | 1.0 mm | 0.10 mm | DSC |
| 26 | $Pd_{75.5}Ag_8Ge_{11.5}P_5$ | 1.0 mm (P/A) | 0.10 mm (P/A) | DSC (Partially amorphous) |
| 27 | $Pd_{77}Ag_8Ge_{10}P_5$ | 1.0 mm (P/A) | 0.10 mm (P/A) | DSC (Partially amorphous) |
| 28 | $Pd_{75.5}Ag_8Si_9P_5S_{2.5}$ | 1.0 mm (P/A) | 0.10 mm (P/A) | DSC, XRD (Partially amorphous) |
| 29 | $Pd_{75.5}Ag_8Si_{2.5}Ge_7P_5S_2$ | 1.0 mm | 0.10 mm | DSC |
| Comparative Example 2 | $Pd_{79}Au_4Si_{17}$ | — | — | DSC (not amorphous) |
| 30 | $Pd_{79}Au_4Si_{12}P_5$ | 2.2 mm | 0.22 mm | DSC, XRD |
| 31 | $Pd_{79}Au_4Si_{12}Ge_5$ | 1.0 mm | 0.10 mm | DSC, XRD (partially amorphous) |
| 32 | $Pd_{79}Au_4Si_{9.5}Ge_{2.5}P_5$ | 1.6 mm | 0.16 mm | DSC |

TABLE 2

| Example | Composition | $T_g$ [° C.] | $T_x$ [° C.] | $\Delta H_x$ [J/g] | $T_s$ [° C.] | $T_l$ [° C.] | $T_g/T_s$ (K/K) | $\Delta H_m$ [J/g] |
|---|---|---|---|---|---|---|---|---|
| Comparative. Example 1 | $Pd_{77.5}Ag_6Si_{16.5}$ | 354 | 403 | −29 | 787 | 809 | 0.59 | 95 |
| 2 | $Pd_{77.5}Ag_6Si_{11.5}P_5$ | 344 | 395 | −29 | 710 | 773 | 0.63 | 89 |
| 3 | $Pd_{77.5}Ag_6Si_9P_{7.5}$ | 338 | 401 | −36 | 710 | 832 | 0.62 | 99 |
| 10 | $Pd_{75}Ag_{8}Si_{11.5}P_5$ | 344 | 375 | −34 | 709 | 796 | 0.63 | 84 |
| 15 | $Pd_{75.5}Ag_8Si_9Ge_{2.5}P_5$ | 341 | 370 | −30 | 693 | 806 | 0.64 | 72 |
| 30 | $Pd_{79}Au_4Si_{12}P_5$ | 344 | 383 | −30 | 719 | 796 | 0.62 | 87 |
| 32 | $Pd_{79}Au_4Si_{9.5}Ge_{2.5}P_5$ | 336 | 370 | −28 | 691 | 737 | 0.63 | 73 |

Figure 2:
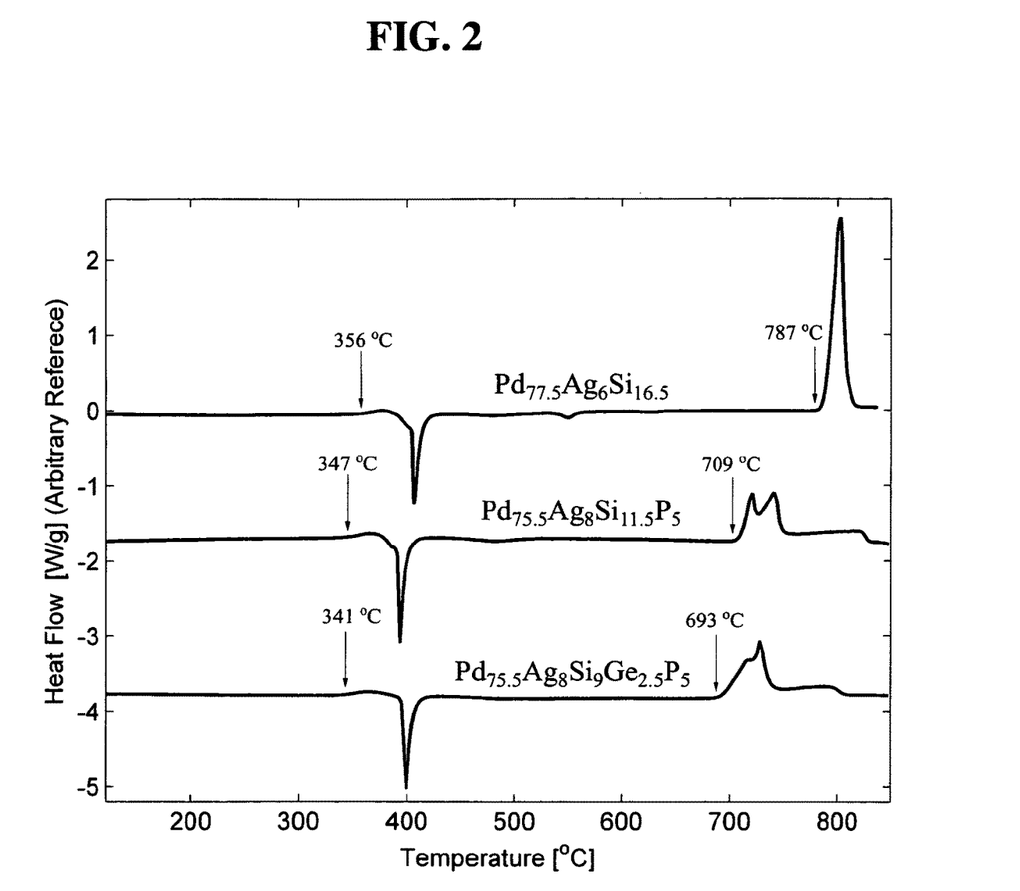
FIG. 2 is a graph comparing the differential scanning calorimetry scans of the alloys prepared according to Examples 2 and 15 and Comparative Example 1.
Figure 3:
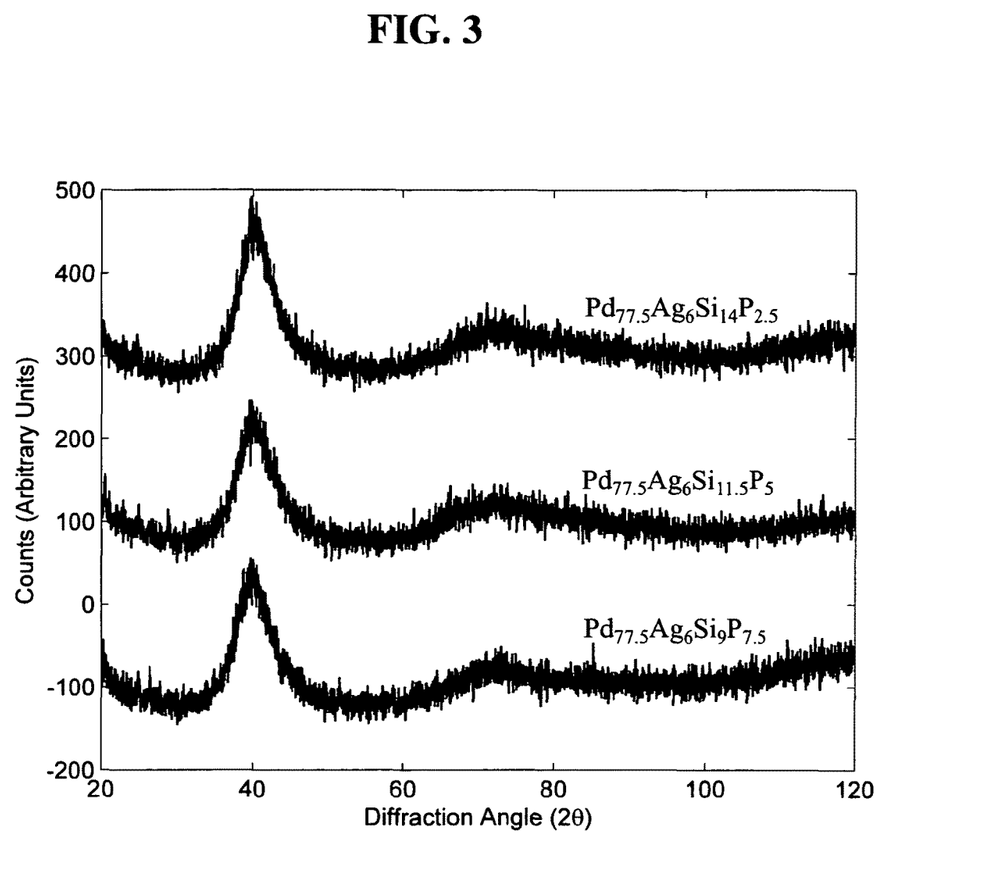
FIG. 3 is a graph of the X-ray diffractograms of the alloys prepared according to Examples 1 through 3.
Figure 4:
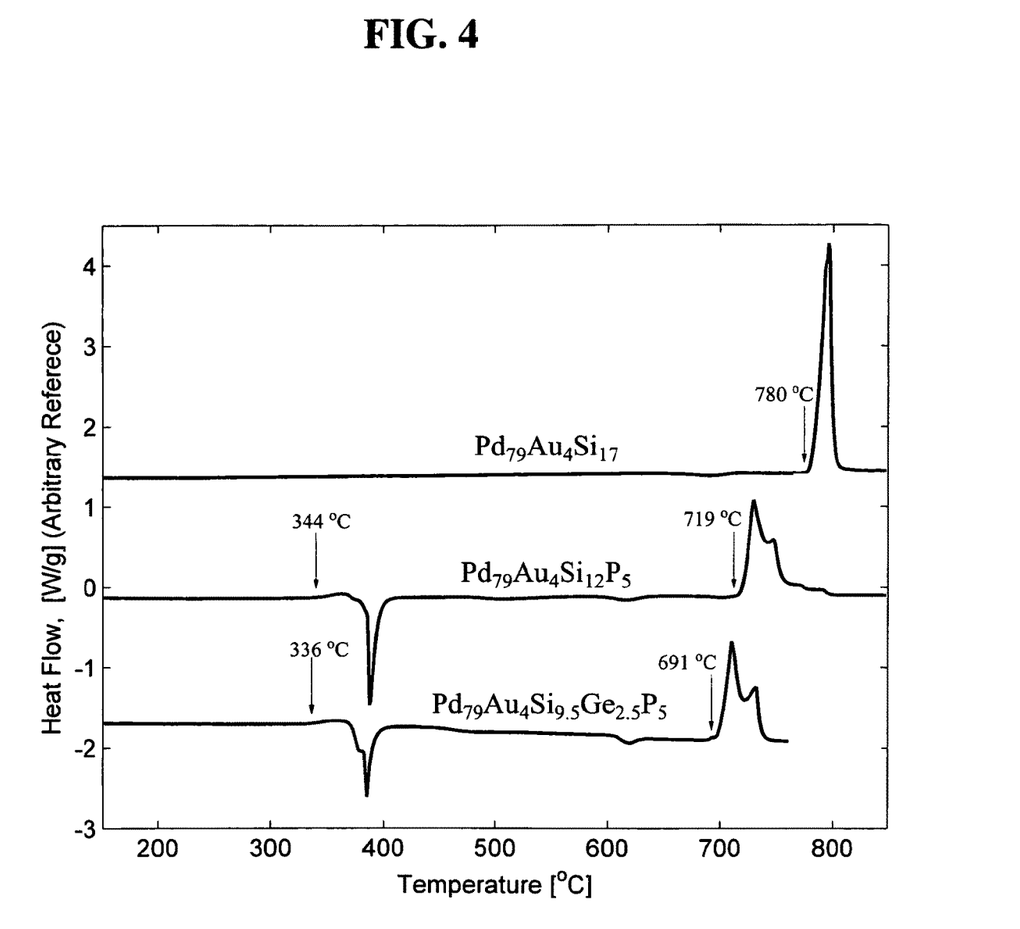
FIG. 4 is a graph comparing the differential scanning calorimetry scans of the alloys prepared according to Examples 30 and 32 and Comparative Example 2.
Figure 5:
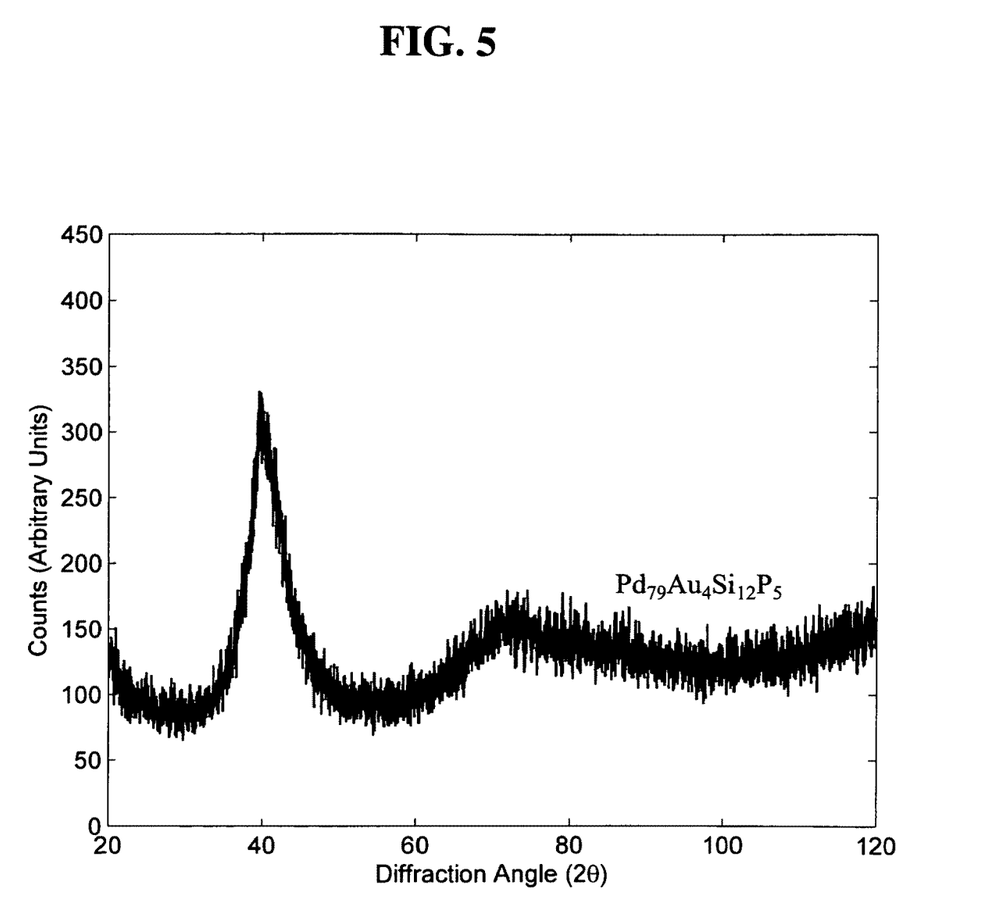
FIG. 5 is an X-ray diffractogram of the alloy prepared according to Examples 30.

The amorphous nature of the compositions of the Examples and Comparative Examples were investigated using at least one of X-ray diffraction analysis, differential scanning calorimetry and microscopic inspection. FIG. 2 compares the differential scanning calorimetry scans of the compositions of Comparative Example 1 and Examples 2 and 14. In FIG. 2, the glass transition and liquidus temperatures for each alloy are indicated. FIG. 2 shows the X-ray diffractograms of the compositions of Examples 1 through 3. As can be seen in FIG. 3, no crystallographic peaks are detected in the diffractograms, indicating the amorphous nature of the alloys. FIG. 4 compares the differential scanning calorimetry scans of the compositions of Comparative Example 2 and Examples 30 and 32. In FIG. 4, the glass transition and liquidus temperatures are indicated, and as shown, no glass transition is detected for the composition of Comparative Example 2. FIG. 5 shows the X-ray diffractogram of the composition of Example 30. As can be seen in FIG. 5, no crystallographic peaks are detected in the diffractogram, thereby verifying the amorphous nature of the alloy.

As shown in Tables 1 and 2 and FIGS. 2 through 5, the compositions of Examples 1 through 32 are all amorphous or at least partially amorphous, whereas the composition of Comparative Example 2 is not amorphous. Although the composition of Comparative Example 1 is amorphous, it can be seen from Table 2 that the composition of Comparative Example 1 has a higher glass transition temperature and solidus temperature. One of the earliest and most widely accepted criteria for quantifying glass forming ability is based on a comparative relation between the glass transition temperature and the melting (solidus or liquidus) temperature (in absolute Kelvin units). According to this criterion, the ratio of the glass transition temperature (below which the liquid kinetically freezes) to the melting temperature (below which the dominant crystalline phase becomes thermodynamically stable), which is termed the "reduced glass transition temperature," is a measure of the ease of bypassing crystallization and forming the amorphous phase. Therefore, according to this criterion, alloys with high reduced glass transition temperatures will exhibit a greater glass forming ability. As seen in Table 1, the introduction of P and Ge into the composition of the Example alloys results in a slightly lower glass transition temperature but also in a dramatically lower solidus temperature with respect to the Comparative Examples. This results in an overall higher reduced glass transition temperature (which is shown to increase from 0.59 to as high as 0.64). This overall increase in reduced glass transition temperature can, to a good approximation, explain the improvement in glass forming ability gained by the introduction of P and Ge into the compositions of the Comparative Examples.

Investigation of Elastic and Mechanical Properties

Figure 6:
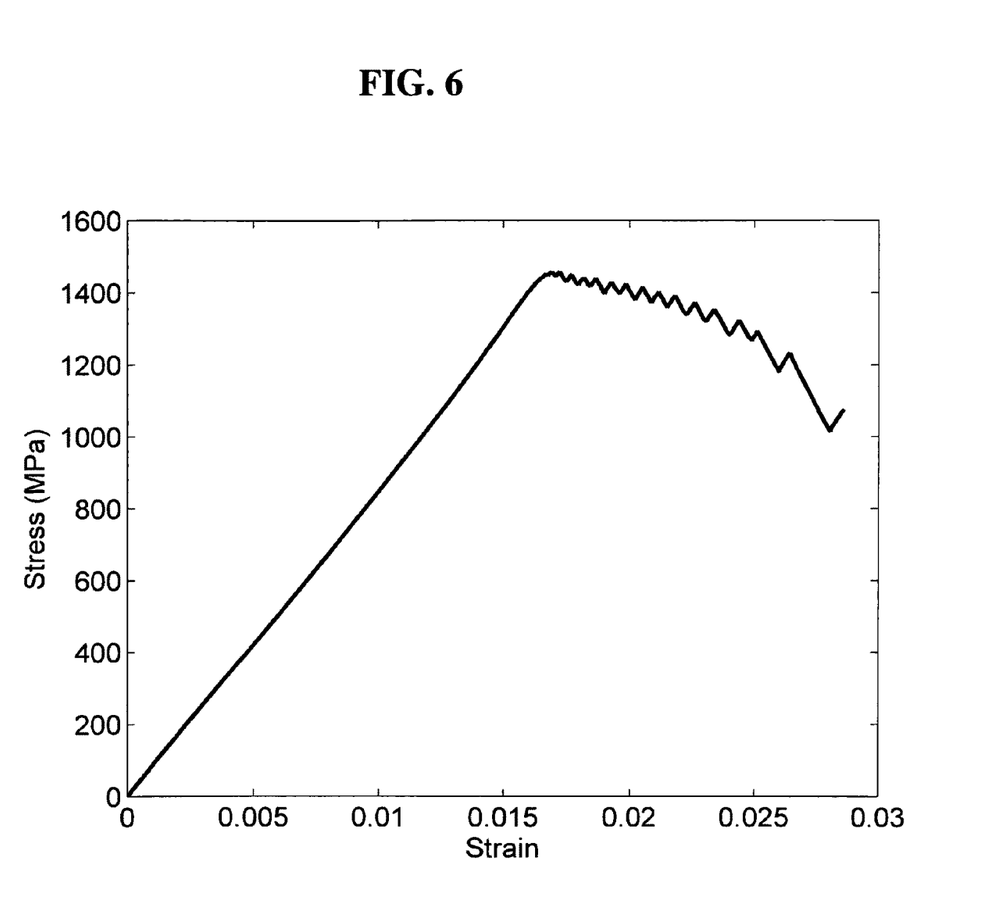
FIG. 6 is graph of the compressive stress-strain response of a glassy $Pd_{77.5}Ag_6Si_9P_{7.5}$ specimen prepared as in Example 3.

The elastic constants of a glassy $Pd_{77.5}Ag_6Si_9P_{7.5}$ cylindrical specimen (3 mm in diameter, 6 mm in height) were measured ultrasonically by measuring the shear and longitudinal wave speeds using a pulse-echo overlap set-up with 5-MHz piezoelectric transducers, and the density using the Archimedes method. The shear modulus, bulk modulus, and Young's modulus were measured to be 30 GPa, 169 GPa, and 85 GPa, respectively, and the Poisson's ratio is found to be 0.42. The compressive loading response of a glassy $Pd_{77.5}Ag_6Si_9P_{7.5}$ cylindrical specimen (3 mm in diameter, 6 mm in height) was investigated using a servo-hydraulic Materials Testing System with a 50-kN load cell. A strain rate of $1\times10^{-4}$ $s^{-1}$ was applied. Strain was measured using a linear variable differential transformer. The recorded stress-strain response of this alloy is shown in FIG. 6, which reveals a yield strength of about 1450 MPa, an elastic strain of about 1.7%, and a plastic strain of about 2%.

Figure 7:
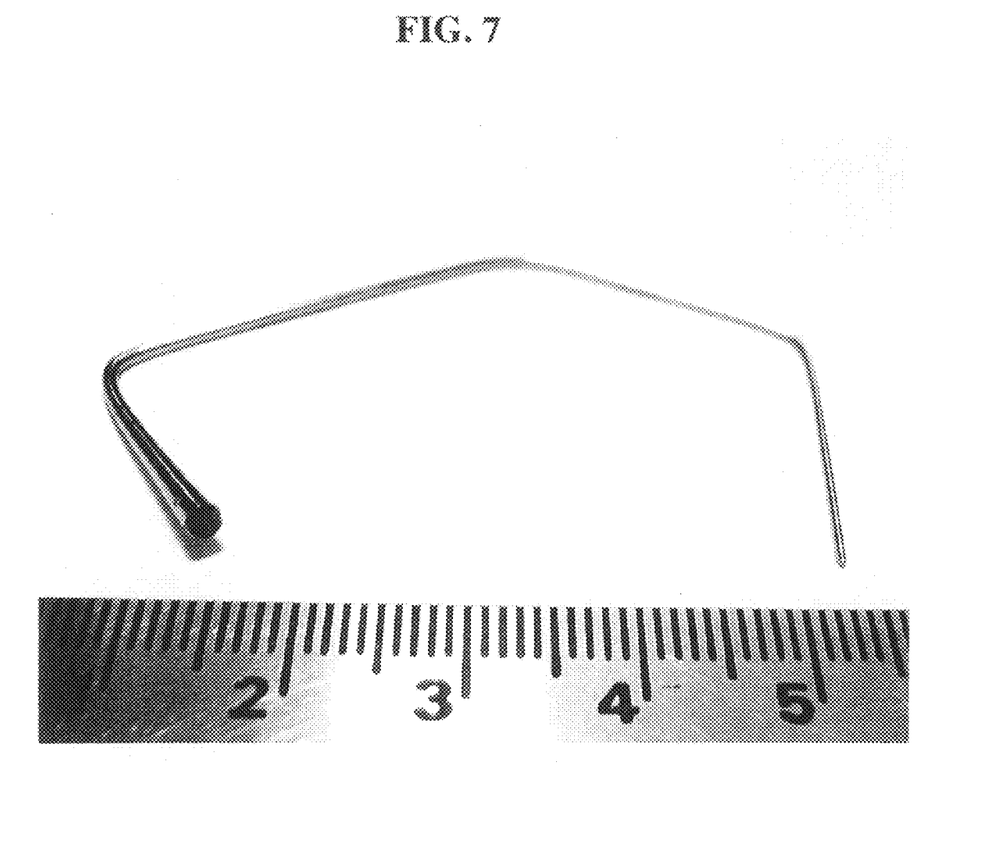
FIG. 7 is a photograph of a bent glassy $Pd_{77.5}Ag_6Si_9P_{7.5}$ wire of variable thickness produced as in Example 3 by the capillary water-quenching method.

The high yield strength and low Young's modulus suggest that this class of alloys exhibit hardness, strength, and elasticity that are considerably higher than typical crystalline engineering metals and comparable to or higher than crystalline metallic biomaterials. Moreover, the very high Poisson's ratio of these alloys, which is in fact one of the highest measured for a metallic glass, suggests that these alloys would exhibit high toughness. In fact, bending of a glassy wire, as shown in FIG. 7, reveals that the wire is able to plastically deform at diameters as high as 1.5 mm while bypassing fracture. The bending ductility at a 1.5 mm section combined with a yield strength of about 1500 MPa indicate a very high fracture toughness of roughly 100 MPa-m$^{1/2}$. Since high hardness, strength, elasticity, and toughness are all highly desirable properties for the proper biomechanical functioning of implant components, it is suggested that the present alloys can be thought of as attractive alternatives to the present load-bearing implant materials.

In Vitro Cytotoxicity Studies

The cytotoxicity of a glassy $Pd_{77.5}Ag_6Si_9P_{7.5}$ test article was evaluated in an in vitro biocompatibility study conducted by NAMSA (Northwood, Ohio). The study was conducted to determine the potential for cytotoxicity and was based on the International Organization for Standardization 10993: Biological Evaluation of Medical Devices Part 5: Test for Cytotoxicity: in vitro Methods guidelines.

A single extract of the test article was prepared using single strength Minimum Essential Medium supplemented with 5% serum and 2% antibiotics (1×MEM). In particular, a 3.1 g portion of the test article was covered with 16 ml of 1×MEM, and a single preparation was extracted with agitation at 37° C. for 24 hours. The test extract was placed onto three separate monolayers of L-929 mouse fibroblast cells propagated in 5% $CO_2$. Three separate monolayers were prepared for the reagent control, negative control and positive control. The reagent control included a single aliquot of 1×MEM without any test material and was subjected to the same extraction conditions as the test article. A high density polyethylene was used as the negative control. A single 30.8 cm$^2$ portion of negative control material was covered with 10 ml of 1×MEM and the preparation was subjected to the same extraction conditions as the test article. A tin stabilized polyvinylchloride was used as the positive control. A single 60.8 cm$^2$ portion of the positive control material was covered with 20 ml of 1×MEM and extracted with agitation at 37° C. for 24 hours.

L-929 mouse fibroblast cells (ATCC CCL 1, NCTC Clone 929, of strain L, or equivalent source) were propagated and maintained in open wells containing 1×MEM in a gaseous environment of 5% $CO_2$. For this study 10 cm$^2$ wells were seeded, labeled with passage number and date, and incubated at 37° C. in 5% CO2 to obtain sub-confluent monolayers of cells prior to use. Triplicate culture wells were selected which contained a sub-confluent cell monolayer. The growth medium contained in triplicate cultures was replaced with 2 ml of the test extract. Similarly, triplicate cultures were replaced with 2 ml of the reagent control, negative control, and positive control. All wells were incubated at 37° C. in the presence of 5% $CO_2$ for 48 hours.

Following incubation, the cultures were examiner microscopically (100×) to evaluate cellular characteristics and percent lysis. The color of the test medium was also observed. A color shift toward yellow was associated with an acidic pH range and a color shift toward magenta to purple was associated with an alkaline pH range. Each culture well was evaluated for percent lysis and cell characteristics based on the rating scale presented in Table 4.

TABLE 3

| Grade | Reactivity | Conditions of all Cultures |
| --- | --- | --- |
| 0 | None | Discrete intracytoplasmic granules; no cell lysis |
| 1 | Slight | Not more than 20% of the cells are round, loosely attached, and without intracytoplasmic granules; occasional lysed cells are present |
| 2 | Mild | Not more than 50% of the cells are round and devoid of intracytoplasmic granules; no extensive cell lysis and empty areas between cells |
| 3 | Moderate | Not more than 70% of the cell layers contain rounded cells or are lysed |
| 4 | Severe | Nearly complete destruction of the cell layers |

The parameters of the test required the negative and reagent controls to rate at grade 0, the positive control to rate at grade 3 or 4, and the test sample to rate at grade 2 or lower.

Under the conditions of the in vitro study, the 1×MEM test extract showed no evidence of causing cell lysis or toxicity. The reagent, positive and negative controls performed as anticipated, and the test sample rated at less than grade 2, thereby meeting the requirements of the test. In particular, each of the test culture wells rated 0, indicating that alloys according to embodiments of the present invention are not cytotoxic.

In Vivo Cytotoxicity Studies

The cytotoxicity of a glassy $Pd_{77.5}Ag_6Si_9P_{7.5}$ test article was evaluated in an in vivo biocompatibility study conducted by NAMSA (Northwood, Ohio). The test article was implanted into muscle tissue of rabbit. The muscle tissue was evaluated for evidence of irritation or toxicity based on the requirements of the International Organization for Standardization 10993: Biological Evaluation of Medical Devices, part 6: Test for Local Effects after Implantation.

A minimum of four sections of the test article per rabbit, each approximately 1 mm×10 mm, were loaded into 14 gauge needles. For each rabbit, a minimum of four negative control samples were loaded into 14 gauge needles. 1 mm×10 mm sections of high density polyethylene were used as the negative control.

The rabbits were weighed and clipped free of fur over the paravertebral muscles. An intramuscular injection of a combination ketamine hydrochloride and xylazine (34 mg/kg+5 mg/kg) general anesthetic was administered to each animal at a dose of 0.6 ml/kg. Each rabbit was then injected subcutaneously with 0.02 mg/kg buprenorphine. After the anesthetic had taken effect, the surgical site was scrubbed with a germicidal soap, wiped with 70% isopropyl alcohol, and painted with povidone iodine.

One incision was made on each side of the back through the skin and parallel to the lumbar region of the vertebral column. A stylet was placed in the hub of a loaded needle. The skin was moved to the desired location and the needle was inserted through the incision into the muscle at a 45° angle. The needle was withdrawn over the stylet, leaving the sample in the paravertebral muscle. Four test article sections were implanted in the right paravertebral muscle of each rabbit. Test article sections were placed at appropriately spaced intervals. In the opposite muscle, four negative control sections were similarly implanted. The skin incisions were closed with tissue glue. After implantation, the rabbits were monitored for recovery from the anesthetic, and another dose of buprenorphine was administered a minimum of four hours after the first dose. A day following implantation, a third buprenorphine injection was administered.

The rabbits were observed daily for general health, and their body weights were recorded prior to implantation and at termination. At two weeks, the rabbits were weighed and then euthanized by an intravenous injection of a sodium pentobarbitol based drug. The paravertebral muscles were dissected free and fixed in 10% neutral buffered formalin (NBF) to facilitate cutting. After fixation, the muscles were methodically cut to locate test and control article sites. All test and control article sites were accounted for. Capsule formation or other signs of irritation were scored using microscopically using low magnification and macroscopically, and the scores were rated as in Table 5.

TABLE 4

| Grade | Condition |
| --- | --- |
| 0 | No capsule, no adverse reaction (other than minimal hemorrhage) |
| 1 | Up to 0.5 mm capsule or reaction area |
| 2 | 0.6 to 1.0 mm capsule or reaction area |
| 3 | 1.1 to 2.0 mm capsule or reaction area |
| 4 | >2.0 mm capsule or reaction area |

Macroscopically, there was no visible reaction at any test or control site. Indeed, each of the test and control sites rated 0, indicating insignificant or nonexistent tissue contact irritation.

Representative tissue implant sites (test and control) from each rabbit were excised, allowing a sufficient area around the site for proper histological preparation. These sections were histologically processed (embedded, sectioned and stained in hemotoxylin and eosin) for microscopic evaluation. The microscopic evaluation of the representative implant sites was conducted to further define any tissue response. The evaluation was conducted by a qualified pathologist. The results of the microscopic evaluation of the test and control sites are shown in Table 6.

TABLE 5

| | Rabbit 1: Test Sites | Rabbit 2: Test Sites | Rabbit 3: Test Sites | Rabbit 1: Control Sites | Rabbit 2: Control Sites | Rabbit 3: Control Sites |
| --- | --- | --- | --- | --- | --- | --- |
| Inflammation Polymorphonuclear | 1 | 1 | 1 | 1 | 1 | 2 |
| Lymphocytes | 1 | 1 | 1 | 1 | 1 | 1 |
| Plasma Cells | 0 | 0 | 0 | 0 | 0 | 0 |
| Macrophages | 1 | 2 | 1 | 2 | 2 | 2 |
| Giant Cells | 1 | 1 | 1 | 1 | 1 | 1 |
| Necrosis | 0 | 0 | 0 | 0 | 0 | 0 |
| Neovascularization | 0 | 0 | 0 | 0 | 0 | 0 |

TABLE 5-continued

|  | Rabbit 1: Test Sites | Rabbit 2: Test Sites | Rabbit 3: Test Sites | Rabbit 1: Control Sites | Rabbit 2: Control Sites | Rabbit 3: Control Sites |
|---|---|---|---|---|---|---|
| Fibrosis | 1 | 1 | 1 | 1 | 1 | 1 |
| Fatty Infiltrate | 0 | 0 | 0 | 0 | 0 | 0 |
| Traumatic Necrosis | 0 | 0 | 0 | 1 | 1 | 0 |
| Foreign Debris | 0 | 0 | 0 | 0 | 0 | 0 |

As shown in Table 6, the test sites performed as good as or even better than the control. Accordingly, the test article was classified as a nonirritant as compared to the negative control. Given the results of the in vitro and in vivo studies, the alloys according to embodiments of the present invention are not cytotoxic, and are therefore suitable for use in biomedical applications.

While the present invention has been illustrated and described with reference to certain exemplary embodiments, those of ordinary skill in the art understand that various modifications and changes may be made to the described embodiments without departing from the spirit and scope of the present invention as defined by the following claims.

What is claimed is:

1. A metallic glass comprising a biocompatible alloy represented by Formula 1:

$$A_a B_b \{(Si)_{1-c}(D)_c\}_d \quad (1)$$

wherein:
A is Pd, or a combination of Pd and Pt,
B is selected from the group consisting of Ag, Au, Co, Fe, and combinations thereof,
D is selected from the group consisting of P, Ge, B, S, and combinations thereof,
a is an atomic fraction ranging from about 0.60 to about 0.90,
b is an atomic fraction ranging from about 0.02 to about 0.18,
c is an atomic fraction ranging from about 0.1 to less than 1, and
d is an atomic fraction ranging from about 0.05 to about 0.25.

2. The metallic glass of claim 1, wherein a is 0.775, b is 0.06, and d is 0.165.

3. The metallic glass of claim 1, a is 0.755, b is 0.08, and d is 0.165.

4. The metallic glass of claim 1, wherein B is selected from the group consisting of Au, Ag and combinations thereof.

5. The metallic glass of claim 1, wherein D is selected from the group consisting of P, Ge and combinations thereof.

6. The metallic glass of claim 1, wherein the biocompatible alloy is selected from the group consisting of $Pd_{77.5}Ag_6Si_{14}P_{2.5}$, $Pd_{77.5}Ag_6Si_{11.5}P_5$, $P_{77.5}Ag_6Si_9P_{7.5}$, $Pd_{77.5}Ag_6Si_{6.5}P_{10}$, $Pd_{77.5}Ag_6Si_4P_{12.5}$, $Pd_{79.5}Ag_4Si_9P_{7.5}$, $Pd_{78.5}Ag_5Si_{11.5}P_5$, $Pd_{76.5}Ag_7Si_{11.5}P_5$, $Pd_{75.5}Ag_8Si_9P_{7.5}$, $Pd_{75.5}Ag_8Si_{11.5}P_5$, $Pd_{75}Ag_{8.5}Si_{11.5}P_5$, $Pd_{73.5}Ag_{10}Si_{11.5}P_5$, $Pd_{76.85}Ag_{8.14}Si_{10.45}P_{4.55}$, $Pd_{74.14}Ag_{7.86}Si_{12.55}P_{5.45}$, $Pd_{75.5}Ag_8Si_9Ge_{2.5}P_5$, $Pd_{75.5}Ag_8Si_{9.5}Ge_2P_5$, $Pd_{75}Ag_{8.5}Si_{9.5}Ge_2P_5$, $Pd_{76}Ag_{7.5}Si_{9.5}Ge_2P_5$, $Pd_{75.5}Ag_8Si_{10.5}Ge_2P_4$, $Pd_{75.5}Ag_8Si_{8.5}Ge_2P_6$, $Pd_{75.5}Ag_8Si_{6.5}Ge_5P_5$, $Pd_{75.5}Ag_8Si_4Ge_{7.5}P_5$, $Pd_{75.5}Ag_8Si_{2.5}Ge_9P_5$, $Pd_{73}Ag_8Ge_{14}P_5$, $Pd_{75.5}Ag_8Ge_{11.5}P_5$, $Pd_{77}Ag_8Ge_{10}P_5$, $Pd_{75.5}Ag_8Si_9P_5S_{2.5}$, $Pd_{75.5}Ag_8Si_{2.5}Ge_7P_5S_2$, $Pd_{79}Au_4Si_{12}P_5$, $Pd_{79}Au_4Si_{12}Ge_5$, $Pd_{79}Au_4Si_{9.5}Ge_{2.5}P_5$, and $Pd_{75.5}Ag_8Si_{2.5}Ge_7P_5S_2$.

7. A three-dimensional object formed of a metallic glass comprising a biocompatible alloy represented by Formula 1:

$$A_a B_b \{(Si)_{1-c}(D)_c\}_d \quad (1)$$

wherein:
A is Pd, or a combination of Pd and Pt,
B is selected from the group consisting of Ag, Au, Co, Fe, and combinations thereof,
D is selected from the group consisting of P, Ge, B, S, and combinations thereof,
a is an atomic fraction ranging from about 0.60 to about 0.90,
b is an atomic fraction ranging from about 0.02 to about 0.18,
c is an atomic fraction ranging from about 0.1 to less than 1, and
d is an atomic fraction ranging from about 0.05 to about 0.25.

8. The three dimensional object of claim 7, wherein the three-dimensional object has a critical casting thickness greater than about 1 mm.

9. The three-dimensional object of claim 7, wherein the three-dimensional object has a critical casting thickness ranging from about 1 mm to about 5 mm.

10. The three-dimensional object of claim 7, wherein the three-dimensional object has a critical casting thickness ranging from about 1 mm to about 4 mm.

11. The three-dimensional object of claim 7, wherein the three-dimensional object is a biomedical component.

12. The three-dimensional object of claim 11, wherein the biomedical component is a dental or orthodontic implant or fixation component.

13. The three-dimensional object of claim 11, wherein the biomedical component is an orthopedic implant or fixation component.

14. The three-dimensional object of claim 7, wherein the three-dimensional object is a jewelry article.

15. The three-dimensional object of claim 7, wherein a is 0.775, b is 0.06, and d is 0.165.

16. The three-dimensional object of claim 7, wherein a is 0.755, b is 0.08, and d is 0.165.

17. The three-dimensional object of claim 7, wherein B is selected from the group consisting of Au, Ag and combinations thereof.

18. The three-dimensional object of claim 7, wherein D is selected from the group consisting of P, Ge and combinations thereof.

19. The three-dimensional object of claim 7, wherein the biocompatible alloy is selected from the group consisting of $Pd_{77.5}Ag_6Si_{14}P_{2.5}$, $Pd_{77.5}Ag_6Si_{11.5}P_5$, $Pd_{77.5}Ag_6Si_9P_{7.5}$, $Pd_{77.5}Ag_6Si_{6.5}P_{10}$, $Pd_{77.5}Ag_6Si_4P_{12.5}$, $Pd_{79.5}Ag_4Si_9P_{7.5}$, $Pd_{78.5}Ag_5Si_{11.5}P_5$, $Pd_{76.5}Ag_7Si_{11.5}P_5$, $Pd_{75.5}Ag_8Si_9P_{7.5}$, $Pd_{75.5}Ag_8Si_{11.5}P_5$, $Pd_{75}Ag_{8.5}Si_{11.5}P_5$, $Pd_{73.5}Ag_{10}Si_{11.5}P_5$, $Pd_{76.85}Ag_{8.14}Si_{10.45}P_{4.55}$, $Pd_{74.14}Ag_{7.86}Si_{12.55}P_{5.45}$, $Pd_{75.5}Ag_8Si_9Ge_{2.5}P_5$, $Pd_{75.5}Ag_8Si_{9.5}Ge_2P_5$, $Pd_{75}Ag_{8.5}Si_{9.5}Ge_2P_5$, $Pd_{76}Ag_{7.5}Si_{9.5}Ge_2P_5$, $Pd_{75.5}Ag_8Si_{10.5}Ge_2P_4$, $Pd_{75.5}Ag_8Si_{8.5}Ge_2P_6$, $Pd_{75.5}Ag_8Si_{6.5}Ge_5P_5$, $Pd_{75.5}Ag_8Si_4Ge_{7.5}P_5$, $Pd_{75.5}Ag_8Si_{2.5}Ge_9P_5$, $Pd_{73}Ag_8Ge_{14}P_5$, $Pd_{75.5}Ag_8Ge_{11.5}P_5$, $Pd_{77}Ag_8Ge_{10}P_5$, $Pd_{75.5}Ag_8Si_9P_5S_{2.5}$, $Pd_{75.5}Ag_8Si_{2.5}Ge_7P_5S_2$, $Pd_{79}Au_4Si_{12}P_5$, $Pd_{79}Au_4Si_{12}Ge_5$, $Pd_{79}Au_4Si_{9.5}Ge_{2.5}P_5$, and $Pd_{75.5}Ag_8Si_{2.5}Ge_7P_5S_2$.

* * * * *

UNITED STATES PATENT AND TRADEMARK OFFICE
CERTIFICATE OF CORRECTION

PATENT NO.         : 8,066,827 B2
APPLICATION NO.    : 12/172908
DATED              : November 29, 2011
INVENTOR(S)        : Marios D. Demetriou et al.

It is certified that error appears in the above-identified patent and that said Letters Patent is hereby corrected as shown below:

In the Claims

Column 11, Claim 6, line 51.    Delete "$P_{77.5}Ag_6Si_9P_{7.5}$,"

Insert -- $Pd_{77.5}Ag_6Si_9P_{7.5}$, --

Signed and Sealed this
Fifth Day of June, 2012

David J. Kappos
*Director of the United States Patent and Trademark Office*